US010699608B1

(12) United States Patent
Hui

(10) Patent No.: US 10,699,608 B1
(45) Date of Patent: Jun. 30, 2020

(54) LIQUID-FILLED ORNAMENT

(71) Applicant: Kiu Hung Industries Limited, Shatin (HK)

(72) Inventor: Ki Yau Hui, Shatin (HK)

(73) Assignee: Kiu Hung Industries Limited, Shatin (HK)

( * ) Notice: Subject to any disclaimer, the term of this patent is extended or adjusted under 35 U.S.C. 154(b) by 0 days.

(21) Appl. No.: 16/251,485

(22) Filed: Jan. 18, 2019

Related U.S. Application Data

(60) Provisional application No. 62/488,316, filed on Apr. 21, 2017.

(51) Int. Cl.
*G09F 19/02* (2006.01)
*A63J 5/02* (2006.01)

(52) U.S. Cl.
CPC .............. *G09F 19/02* (2013.01); *A63J 5/028* (2013.01)

(58) Field of Classification Search
None
See application file for complete search history.

(56) References Cited

U.S. PATENT DOCUMENTS

| 2,282,430 | A | * | 5/1942 | Smith | ............... | G09F 11/34 40/426 |
| 6,508,022 | B2 | | 1/2003 | Huang | | |
| 6,588,130 | B1 | * | 7/2003 | Yang | ............... | G09F 19/02 40/406 |
| 6,880,274 | B2 | * | 4/2005 | Liu | ............... | G09F 19/08 40/406 |
| 6,895,703 | B2 | * | 5/2005 | Tien | ............... | G09F 19/02 40/406 |
| 2002/0100195 | A1 | * | 8/2002 | Hsu | ............... | G09F 19/02 40/409 |
| 2014/0127756 | A1 | * | 5/2014 | Bolz | ............... | C12M 39/00 435/99 |
| 2015/0273100 | A1 | * | 10/2015 | David | ............... | A61L 9/122 40/406 |

* cited by examiner

*Primary Examiner* — Kristina N Junge
(74) *Attorney, Agent, or Firm* — Wood, Phillips, Katz, Clark & Mortimer

(57) ABSTRACT

A liquid-filled ornament comprising a base. A transparent casing is filled with a liquid and bits of solid material disposed in the liquid. A driving mechanism includes a motor and a bar rotated by operation of the motor. A pair of magnets are mounted on opposite ends of the bar. A driven mechanism is located entirely within the casing and includes a base. A support is operatively connected to the base by a cylindrical shaft having upper and lower shoulders. A rotating member has a planar body with a central opening received on the shaft and including a plurality of radially outwardly extending paddles for stirring the liquid upon rotation of the rotating member. Each paddle is in a plane perpendicular to the planar body. The paddles taper above and below the planar body. A pair of magnets are positioned on the planar body, aligned with the pair of magnets on the bar, for magnetic interaction with the pair of magnets mounted on the bar, so that the rotating member is rotated by rotation of the bar. The bits of solid material are dispersed through the liquid by the paddles upon rotation of the rotating member.

15 Claims, 3 Drawing Sheets

LIQUID-FILLED ORNAMENT

FIELD OF THE INVENTION

This invention relates to a liquid-filled ornament and, more particularly, to improved circulation of "snowflakes".

BACKGROUND OF THE INVENTION

A liquid-filled ornament in one form is referred to as a "snow globe". A typical snow globe includes a transparent casing, often spherical, made of glass or plastic and enclosing a miniaturized scene. The scene often depicts the geographic location, landscape or a figurine. The casing encloses a liquid and bits of a solid material disposed in the liquid. The solid material may be glitter or the like or may be small white bits intended to represent snowflakes. Traditionally, the globe is shaken to churn the snow which then falls slowly down through the water.

U.S. Pat. No. 6,508,022 illustrates an improved liquid filled ornament in which paddles are motor driven to stir up the snow to disperse the snow throughout the liquid. While the liquid-filled ornament disclosed therein is satisfactory for its intended purpose, it uses a design including a substantial number of pieces disposed in the liquid. Also, the design generates a single direction of water current and may result in the bits being trapped inside the structure.

This application is directed to an improved liquid-filled ornament.

SUMMARY OF THE INVENTION

In accordance with the invention, a liquid-filled ornament uses fewer parts and provides improved dispersal of bits in the liquid to provide a better floating snow effect.

There is disclosed herein a liquid-filled ornament comprising a base. A transparent casing is filled with a liquid and bits of solid material disposed in the liquid. The casing has an opening and is mounted on the base. A sealing wall extends across and seals the opening against loss of the liquid from the casing. A driving mechanism is located within the base and includes a motor and a bar rotated by operation of the motor. A pair of magnets are mounted on opposite ends of the bar. A driven mechanism is located entirely within the casing and includes a base fixedly mounted to the sealing wall. A support is operatively connected to the base by a cylindrical shaft having upper and lower shoulders. A rotating member has a planar body with a central opening received on the shaft between the upper and lower shoulders and including a plurality of radially outwardly extending paddles for stirring the liquid upon rotation of the rotating member. Each paddle is in a plane perpendicular to the planar body. The paddles taper above and below the planar body. A pair of magnets are positioned on the planar body, aligned with the pair of magnets on the bar, for magnetic interaction with the pair of magnets mounted on the bar, so that the rotating member is rotated by rotation of the bar. A display object is mounted on the first member and visible in the liquid. The bits of solid material are dispersed through the liquid by the paddles upon rotation of the rotating member.

It is a feature that the base comprises a lower disk having an upwardly extending cylindrical lower collar. The lower collar narrows to define the lower shoulder and has a cylindrical lower neck extending upwardly from the lower shoulder.

It is another feature that the support comprises an upper disk having a downwardly extending upper collar narrowing to define the upper shoulder and an upper cylindrical neck extending downwardly from the upper shoulder.

It is a further feature that one of the upper or lower cylindrical neck is telescopically received in the other of the upper or lower cylindrical neck to define the cylindrical shaft.

It is an additional feature that the rotating member is of one-piece plastic construction.

It is another feature that the paddles are diamond-shaped in cross section.

It is still a further feature that the planar body includes an annular ring surrounding the central opening and of a thickness corresponding to space between the upper and lower shoulders.

It is another feature that the sealing wall is part of a cap-like stopper fitted within the opening of the casing.

It is still another feature that the casing is substantially spherical.

It is an additional feature that the planar body supports six paddles equally angularly spaced relative to the central opening.

It is another feature that the planar body comprises a pair of recesses receiving the magnets. Covers may be provided over the recesses to enclose the magnets.

It is an additional feature that the paddles extend radially outwardly beyond the support.

It is another feature that the paddles are arranged in a uniform pitch.

It is still another feature that the driving mechanism includes a spring motor.

Further features will be readily apparent from the specification and from the drawings.

and

Figure 11:
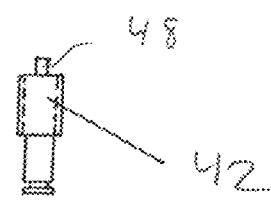
FIG. 11 is a side view of a shaft for rotating the bar of FIG. 9.
Figure 7:
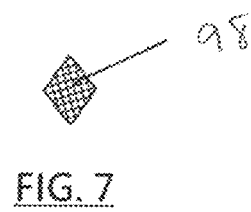
FIG. 7 is a sectional view taken along the line 7-7 of FIG. 5.
Figure 12:
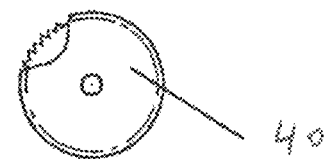
Figure 8:
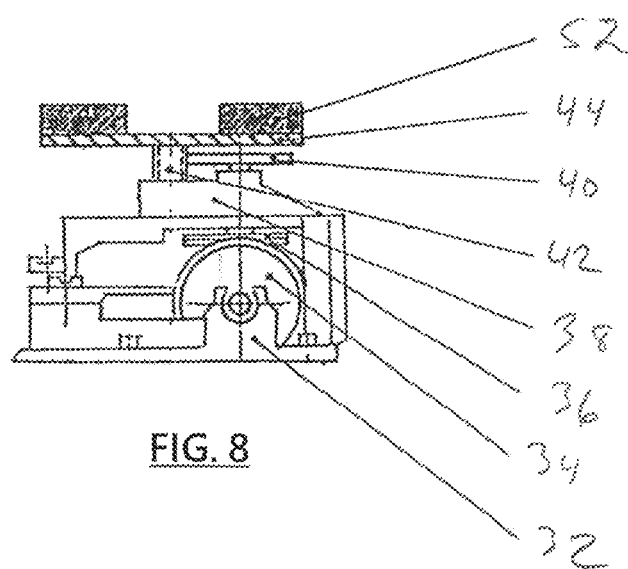
FIG. 8 is a side; partial sectional view of a driving mechanism of the liquid-filled ornament of FIG. 1.

FIG. 12 is a plan view of a gear wheel for driving the shaft of FIG. 11.

DETAILED DESCRIPTION OF THE INVENTION

Figure 1:
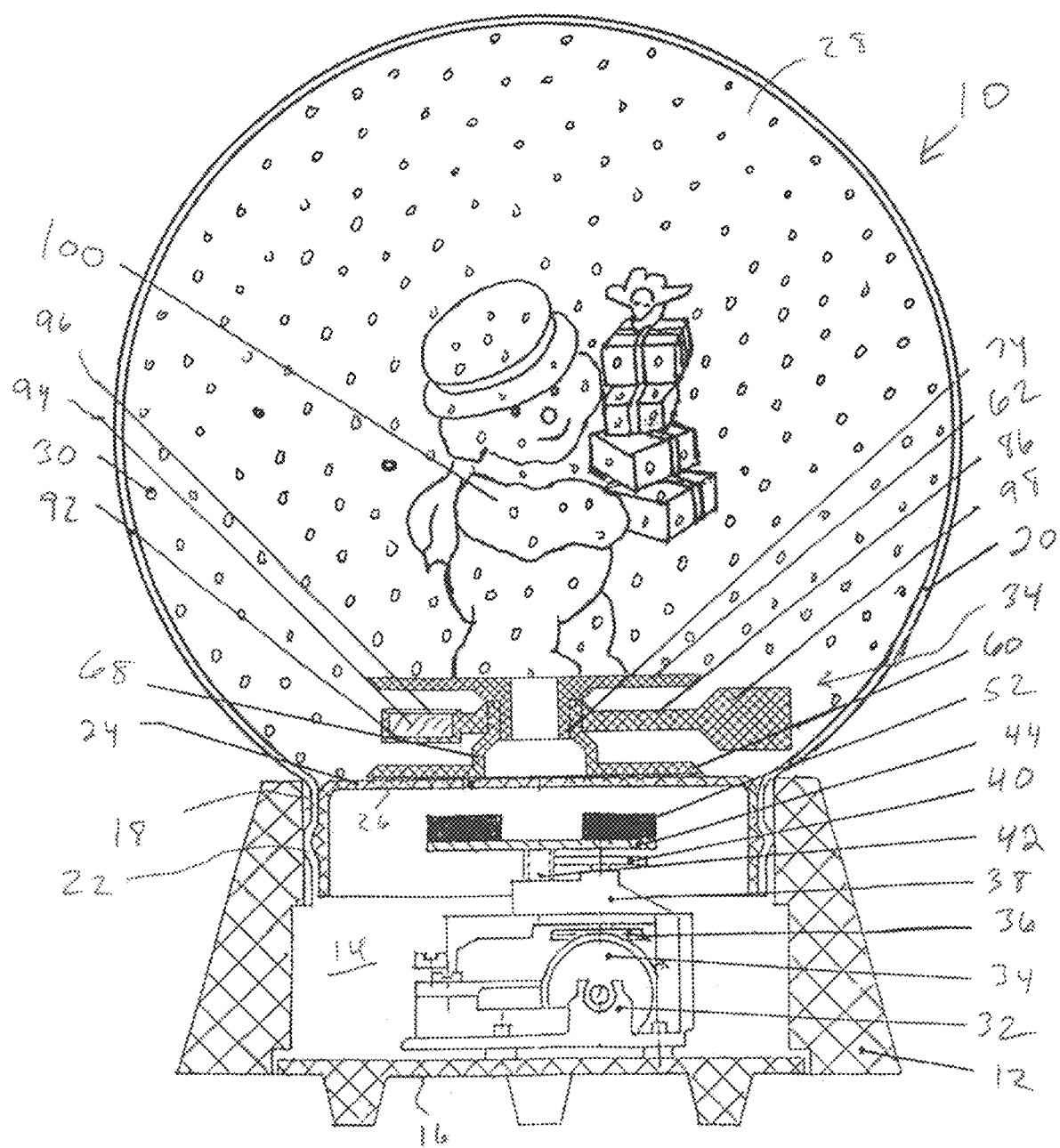
FIG. 1 is a cross-sectional side view of a liquid-filled ornament in accordance with the invention.

Referring initially to FIG. 1, a liquid-filled ornament 10 in accordance with the invention has a hollow base 12. The base 12 is generally cylindrical to define an interior space 14. A cover 16 is removably mounted to the base 12 to close the bottom of the space 14. The base 12 includes an upper cylindrical opening 18. A spherical transparent casing 20 is supported on the base 12. The casing 20 has a central cylindrical bottom opening 22 received in the base upper cylindrical opening 18. A rubber stopper 24 is tight fit within the bottom opening 22 and has a horizontal circular sealing wall 26 to close the casing 20.

The casing 20 is filled with a liquid 28 and bits 30 of solid material disposed in the liquid 28. In one embodiment, the bits 30 are white and adapted to resemble snowflakes.

The ornament 10 includes a driving mechanism 32 located below the sealing wall 26 within the interior space 14. A driven mechanism 34 is provided on the upper side of the sealing wall 26 of the stopper 24 and immersed in the liquid 28 in the interior of the casing 20.

Figure 9:
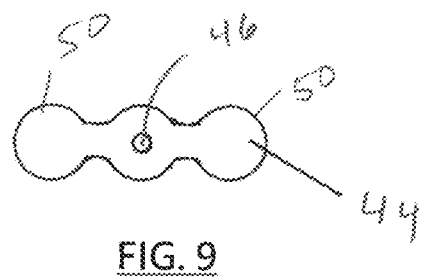
FIG. 9 is a plan view of a bar of the driving mechanism of FIG. 8.
Figure 10:
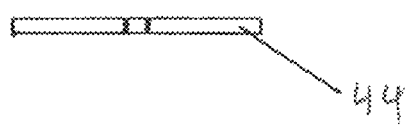
FIG. 10 is a side view of the bar of FIG. 9.

The driving mechanism 32 incorporates a conventional spring-operated motor having a driving gear wheel 34. A first driven gear wheel 36 is rotated by the driving gear wheel 34. A coupler 38 connects the first driven gear wheel 36 to a second driven gear wheel 40. The second driven gear wheel 40, see also FIG. 12, drives a shaft 42. A bar 44 is mounted atop the shaft 42. The bar 44, see also FIGS. 9 and 10, is generally planar and includes a central opening 46 receiving a stub 48 of the shaft 42, see FIG. 11. Opposite ends 48 and 50 of the bar 44 are circular. A pair of magnets 52 are glued to the opposite ends 48 and 50.

The described gear arrangement permits adjustment of the speed of the bar so that a small inexpensive spring driven or electrical motor can be used in the drive mechanism 32. If the motor has a high speed, then it can be reduced by the disclosed gearing arrangement. The magnets 52 are positioned within the stopper 24 at a position immediately below the sealing wall 26.

Referring to FIGS. 2-5, the driven mechanism 34 comprises a base 60, a support 62 and a rotating member 64.

Figure 4:
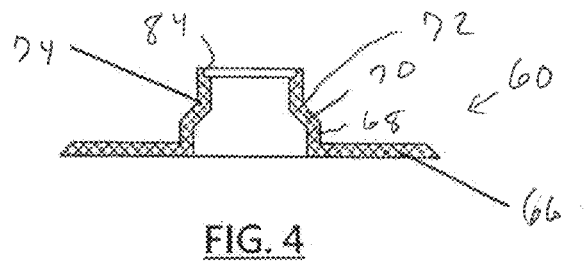
FIG. 4 is a side sectional view of a base of the driven mechanism of FIG. 2.

The base 60, see FIG. 4, comprises a lower disk 66 having an upwardly extending cylindrical lower collar 68 narrowing at 70 to define a lower shoulder 72 and having a cylindrical lower neck 74 extending upwardly from the lower shoulder 72.

Figure 3:
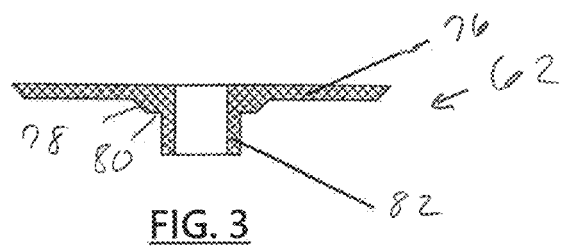
FIG. 3 is a side section view of a support of the driven mechanism of FIG. 2.

The support 62, see FIG. 3, comprises an upper disk 76 having a downwardly extending upper collar 78 which narrows to define an upper shoulder 80. An upper cylindrical neck 82 extends downwardly from the upper shoulder 80.

The support upper cylindrical neck 82 is telescopically received in the base lower cylindrical neck 74 with the upper shoulder 80 resting on a top edge 84 of the lower cylindrical neck 74. As such, the lower cylindrical neck 74 defines a shaft between the lower shoulder 70 and the upper shoulder 80.

Figure 2:
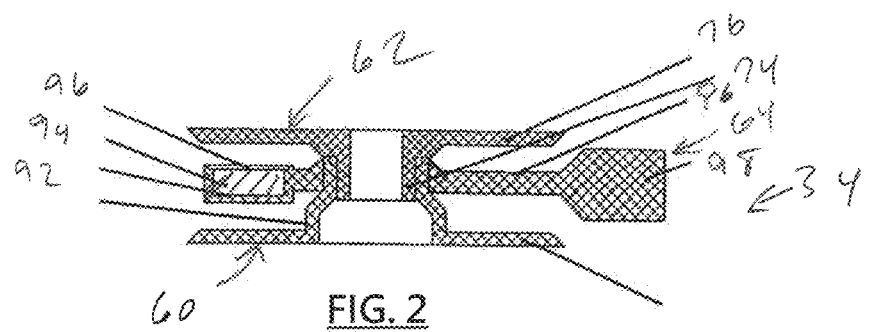
FIG. 2 is a side sectional view of a driven mechanism of the liquid-filled ornament of FIG. 1.
Figure 5:
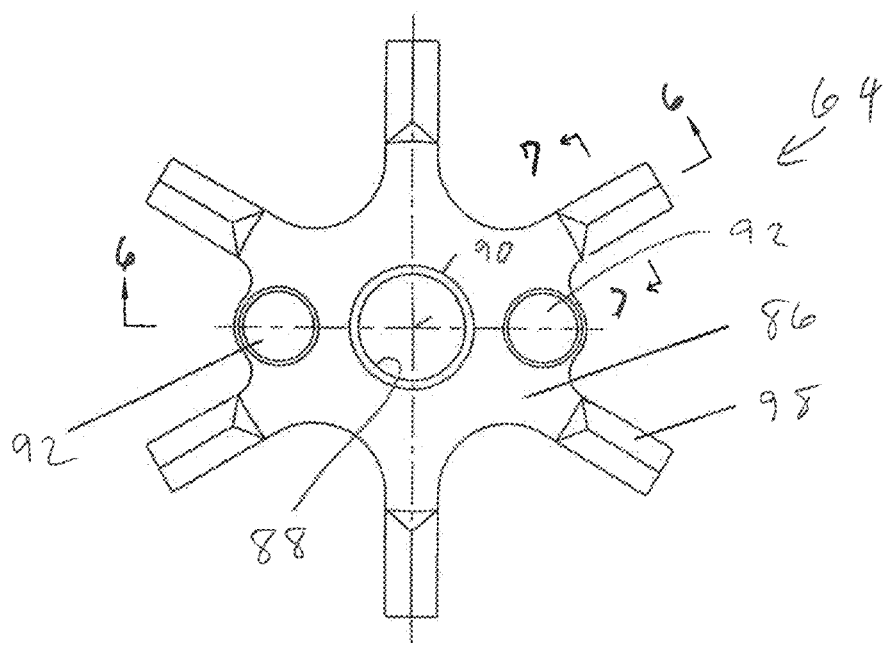
FIG. 5 is a plan view of a rotating member of the driven mechanism of FIG. 2.
Figure 6:
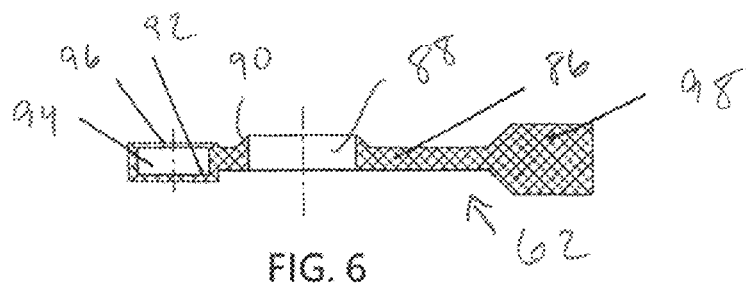
FIG. 6 is a sectional view taken along the line 6-6 of FIG. 5.

The rotating member 62, see FIG. 5, has a planar body 86 with a central opening 88 of a size adapted to be received on the shaft 74, as shown in FIG. 2. An annular ring 90 extends upwardly from the planar body 86 surrounding the circular opening 88. Thickness of the ring 90 and planar body 86 is slightly less than spacing between the shoulders 70 and 80 to be received therebetween, see FIG. 2. The planar body 86 includes a pair of recesses 92 on opposite sides of the central opening 88. The recesses 92 are spaced apart a distance corresponding to spacing between the magnets 52. As shown in FIG. 2, each recess 92 houses a magnet 94 and each recess 92 is sealed by a cover 96 to retain the magnet 94 in the recess 92.

The rotating member 62 includes six equally angularly spaced paddles 98 radially extending from the planar body 86. The paddles 98 are arranged at a uniform pitch and are in a plain perpendicular to the planar body 86. In the illustrated embodiment, the paddles 98 are diamond-shaped in cross section providing a structure which tapers above and below the planar body 86. Other similar shapes, such as oval, or the like, could also be used. The rotating member 62 is of one-piece plastic construction. With the opening 88 received on the shaft 74, the paddles 98 extend beyond the support disk 76.

For the described construction, when the motor 34 is operated to rotate the bar 44 and thus magnets 52, the magnets 94, being aligned with the magnets 52 cause the rotating member 64 to rotate. Rotation of the rotating member 64 causes the paddles to stir up the bits 30 in the liquid 28 so that they are dispersed through the liquid to provide a snow like effect.

In accordance with the invention, the driven mechanism 34 includes three primary components being the base 60, the support 62 and the rotating member 64. The diamond-shaped paddles 98 enhance water current so that it is in multiple directions providing an improved floating snow effect. This structure also eliminates a casing required to house a wheel and ball bearings as in previous designs noted above. This reduces friction and allows more space and snow is not easily trapped.

A decorative object 100 is mounted atop the support 62, as shown in FIG. 1. The decorative object may take any known form.

Thus, the rotating member 64 is turned through magnetic interaction between the lower driving magnets 52 and the upper driven magnetics 94. Upon turning, the paddles 98 will circulate the liquid 28, which will in turn carry with it and churn the bits 30 to simulate a snow fall scene around the display object 100 within the casing 20.

The invention has been described by way of example only, and various other modifications of and/or alterations to the described embodiments may be made by persons skilled in the art without departing from the scope of the invention as specified in the following claims.

It will be appreciated by those skilled in the art that there are many possible modifications to be made to the specific forms of the features and components of the disclosed embodiments while keeping within the spirit of the concepts disclosed herein. Accordingly, no limitations to the specific forms of the embodiments disclosed herein should be read into the claims unless expressly recited in the claims. Although a few embodiments have been described in detail above, other modifications are possible. Other embodiments may be within the scope of the following claims.

The foregoing disclosure of specific embodiments is intended to be illustrative of the broad concepts comprehended by the invention.

The invention claimed is:

1. A liquid-filled ornament comprising:
    a base;
    a transparent casing filled with a liquid and bits of a solid material disposed in the liquid, the casing having an opening and being mounted on the base;
    a sealing wall extending across and sealing the opening against loss of the liquid from the casing;
    a driving mechanism located within the base and including a motor driving a bar, so that the bar is rotated by operation of the motor, and a pair of magnets mounted on opposite ends of the bar;
    a driven mechanism located entirely within the casing and including:
        a base fixedly mounted to the sealing wall, a support operatively connected to the base by a cylindrical shaft having upper and lower shoulders, a rotating member having a planar body with a central opening received on the shaft between the upper and lower shoulders and including a plurality of radially outwardly extending paddles for stirring the liquid upon rotation of the rotating member, each paddle being in a plane perpendicular to the planar body, the paddles tapering above and below the planar body, and a pair of magnets positioned on the planar body, aligned with the pair of magnets on the bar, for magnetic interaction with the pair of magnets mounted on the bar, so that the rotating member is rotated by rotation of the bar; and a display object mounted on the first member and visible in the liquid, the bits of solid material being dispersed through the liquid by the paddles upon rotation of the rotating member.

2. The liquid-filled ornament as claimed in claim 1, wherein the base comprises a lower disk having an upwardly extending cylindrical lower collar, the lower collar narrowing to define the lower shoulder and having a cylindrical lower neck extending upwardly from the lower shoulder.

3. The liquid-filled ornament as claimed in claim 2, wherein the support comprises an upper disk having a downwardly extending upper collar narrowing to define the upper shoulder and an upper cylindrical neck extending downwardly from the upper shoulder.

4. The liquid-filled ornament as claimed in claim 3, wherein one of the upper or lower cylindrical neck is telescopically received in the other of the upper or lower cylindrical neck to define the cylindrical shaft.

5. The liquid-filled ornament as claimed in claim 1, wherein rotating member is of one-piece plastic construction.

6. The liquid-filled ornament as claimed in claim 1, wherein the paddles are diamond-shaped in cross section.

7. The liquid-filled ornament as claimed in claim 1, wherein the planar body includes an annular ring surrounding the central opening and of a thickness corresponding to space between the upper and lower shoulders.

8. The liquid-filled ornament as claimed in claim 1, wherein the sealing wall is part of a cap-like stopper fitted within the opening of the casing.

9. The liquid-filled ornament as claimed in claim 1, wherein the casing is substantially spherical.

10. The liquid-filled ornament as claimed in claim 1, wherein the planar body supports six paddles equally angularly spaced relative to the central opening.

11. The liquid-filled ornament as claimed in claim 1, wherein the planar body comprises a pair of recesses receiving the magnets.

12. The liquid-filled ornament as claimed in claim 11, further comprising covers over the recesses to enclose the magnets.

13. The liquid-filled ornament as claimed in claim 1, wherein the paddles extend radially outward beyond the support.

14. The liquid-filled ornament as claimed in claim 1, wherein the paddles are arranged at a uniform pitch.

15. The liquid-filled ornament as claimed in claim 1, wherein the driving mechanism includes a spring motor.

* * * * *